United States Patent
Berke et al.

(12)

(10) Patent No.: US 6,358,310 B1
(45) Date of Patent: Mar. 19, 2002

(54) AIR ENTRAINING ADMIXTURE COMPOSITIONS

(75) Inventors: Neal S. Berke, North Chelmsford; Maria C. Hicks, Newton; James J. Malone, Stoneham, all of MA (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

(21) Appl. No.: 09/881,161

(22) Filed: Jun. 14, 2001

(51) Int. Cl.[7] .............................................. C04B 24/02
(52) U.S. Cl. ....................... 106/802; 106/724; 106/725; 106/727; 106/728; 106/808; 106/809; 106/810; 106/822; 106/823; 524/5
(58) Field of Search ................................. 106/802, 724, 106/725, 727, 728, 808, 809, 810, 822, 823; 524/5

(56) References Cited

U.S. PATENT DOCUMENTS

| | | | |
|---|---|---|---|
| 3,663,251 A | 5/1972 | Moren et al. ................ 588/215 |
| 4,547,223 A | 10/1985 | Golo et al. .................... 106/90 |
| 5,326,397 A | 7/1994 | Abdelrazig et al. ......... 106/808 |
| 5,413,634 A | 5/1995 | Shawl et al. ................. 106/696 |
| 5,556,460 A | 9/1996 | Berke et al. ................. 106/823 |
| 5,603,760 A | 2/1997 | Berke et al. ................. 106/802 |
| 5,604,273 A | 2/1997 | Kerkar et al. ................... 524/4 |
| 5,618,344 A | 4/1997 | Kerkar et al. ................ 106/823 |
| 5,622,558 A | 4/1997 | Berke et al. ................. 106/802 |
| 5,626,663 A | 5/1997 | Berke et al. ................. 106/696 |
| 5,679,150 A | 10/1997 | Kerkar et al. ............... 106/808 |
| 5,779,788 A | 7/1998 | Berke et al. ................. 106/809 |
| 5,938,835 A | 8/1999 | Shawl et al. ................. 106/724 |
| 6,277,191 B1 | 8/2001 | Budiansky et al. ......... 106/802 |

FOREIGN PATENT DOCUMENTS

| | | | |
|---|---|---|---|
| JP | 11-180747 | 7/1999 | ...................... 24/2 |
| WO | 99-65841 | 12/1999 | ...................... 24/2 |

OTHER PUBLICATIONS

"Pluronic & Tetronic Surfactants", BASF, (no date given).

*Primary Examiner*—Paul Marcantoni
(74) *Attorney, Agent, or Firm*—Craig K. Leon; William L. Baker

(57) ABSTRACT

Additive for cementitious compositions, comprising: at least one admixture, such a shrinkage reducing admixture, an air entraining admixture, a water reducing admixture, an inorganic salt, a corrosion inhibitor, an accelerator, a retarder, or mixture thereof; and a triblock polyoxyalkene copolymer surfactant having the formula $R^1O-(A^1O)_x-(A^2O)_y-(A^1O)_x-R^2$ wherein $R^1$ and $R^2$ individually represent hydrogen, a $C_1-C_7$ alkyl group, a $C_5-C_6$ cycloalkyl group, or an aryl group; $A^1$ represents a $C_2$ alkyl group, $A^2$ represents a branched or linear $C_3$ alkyl group; "x" represents an integer of 42–133; and "y" represents an integer of 21 to 68.

28 Claims, No Drawings

AIR ENTRAINING ADMIXTURE COMPOSITIONS

FIELD OF THE INVENTION

The present invention relates to the field of concrete admixtures, and more particularly to controlling air entrainment in hydraulic cementitious compositions treated with at least one admixture, such as a shrinkage reducing admixture ("SRA"), and particularly an oxylalkylene SRA.

BACKGROUND OF THE INVENTION

Air entrainment is important for increasing resistance of hydraulic cementitious compositions, such as mortar, masonry, and concrete, to frost attack and deterioration due to repeated freezing and thawing. Entrained air is desirable, therefore, for long-term durability of concrete or mortar in adverse freeze-thaw conditions.

Technically speaking, air entraining admixtures (AEAs) do not generate air in the concrete, but merely stabilize the air either (1) infolded and mechanically enveloped during mixing, (2) dissolved in the mix water, (3) originally present in the intergranular spaces in the dry cement and aggregate; or (4) in the pores of the aggregate. While it is true that the entrained air is within the total mass of concrete, it is only entrained in the paste portion of the mix.

Entrained air is fundamentally different than "entrapped" air. Most of the air that is in concretes, in the absence of admixtures, is often referred to as "entrapped" air. Entrained air is characterized by uniformly dispersed, spherical spaces in cement paste; whereas entrapped air is characterized by irregularly shaped voids which are not generally uniformly sized but generally larger than "entrained" air voids. See e.g., *Concrete Admixtures*, Vance Dodson (Van Nostrand Reinhold, New York 1990), P. 129 et seq.

The present inventors have discovered an air entrainment problem that arises when oxyalkylene based shrinkage reducing admixtures (SRAs), in concrete and mortar, are used in conjunction with water soluble salts. Oxyalkylene SRAs are known in the art. For example, U.S. Pat. No. 5,413,634 of Shawl et al., incorporated herein by reference, discloses an alkyl ether derivative of an aliphatic polyhydroxyl compound containing an oxyalkylene group.

However, when an oxyalkylene SRA is used with a water soluble salt (such as calcium nitrite), sufficient and controllable levels of entrained air are difficult to attain. This was found to be the case even when the SRAs were used in combination with conventional air entraining admixtures, such as tall oil and vinsol resin. Accordingly, a novel air entraining admixture or system is needed.

In World Patent Application Serial No. PCT/US99/13323, Budiansky et al. disclosed polyoxyalkylene polymers, such as di-block polyethylene glycol and polypropylene glycol polymers, for entraining air in cementitious compositions. These are successful in entraining air in the presence of calcium based salts such as calcium nitrite when the diether content of the SRA is below 0.4%.

In U.S. Pat. No. 5,603,760, Berke et al disclosed the addition to the SRA of at least one ammonium salt of tall oil fatty acid.

However, in both of the preceding patents, the SRA needs to have a diether impurity of under 0.5% to be effective, and even under these conditions only the system disclosed by Budiansky et al. would appear to entrain air in the presence of calcium based salts such as calcium nitrite. Moreover, as the temperature of the concrete increases, the difficult of entraining air also increases, such that the practice of incorporating surfactants to improve high temperature air entrainment would tend to provide disadvantages at lower temperatures due to the consequent entrainment of too much air.

Furthermore, the removal from the SRAs of diether impurities requires additional distillation steps which are not desirable. Thus, there is a need to overcome the problems associated with high diether content and to obtain a finer entrained air void system using oxyalkylene SRAs.

SUMMARY OF THE INVENTION

In surmounting the difficulties of the prior art, the present invention provides an additive composition for modifying a cementitious composition, comprising: at least one admixture, such as an oxyalkylene water reducer (e.g., superplasticizer), an oxyalkylene shrinkage reducing admixture, or mixture thereof; and a triblock polyoxyalkylene copolymer surfactant. The triblock polyoxyalkylene copolymer surfactant, in particular, enhances air entrainment in cementitious compositions containing one or other admixtures that typically inhibit such air entrainment.

Thus, an exemplary additive composition of the invention comprises: (A) at least one admixture comprising a shrinkage reducing admixture, an air entraining admixture, a water reducing admixture, an inorganic salt, a corrosion inhibitor, an accelerator, a retarder, or mixture thereof; and (B) a triblock polyoxyalkylene copolymer surfactant having the formula $R^1O—(A^1O)_x—(A^2O)_y—(A^1O)_x—R^2$ wherein $R^1$ and $R^2$ represent hydrogen, a $C_1$–$C_7$ alkyl group, a $C_5$–$C_6$ cycloalkyl group, or an aryl group; $A^1$ represents a $C_2$ alkyl group, $A^2$ represents a $C_3$ alkyl group; "x" represents an integer of 42 to 133; and "y" represents an integer of 21 to 68. Exemplary triblock polyoxyalkylene copolymer surfactants have an hydrophilic/lipophilic balance (HLB) of 20–30, and preferably an average molecular weight between 7,000 and 20,000 and, more preferably, between 8,000 and 15,000. The present inventors have discovered that such surfactants enhance the formation of an air void system with spacing factors and surface areas within the range needed to provide resistance to freezing and thawing damage as recommended by American Concrete Institute, Detroit, Mich., as explained in ACI 212.3R-91. The inventors also discovered that the surfactants are useful, when combined with tall oil based air entraining admixtures, for example, to produce enhanced air void systems in concrete mixtures having a water reducer, superplasticizer, corrosion inhibitor, set retarder, and/or damp-proofing additives, with or without an SRA being present in the concrete mixture. It is believed that triblock polyoxyalkylene copolymer surfactants as described herein and below will work well when blended, admixed, or interground with cementitious compositions containing fly ash, silica fume, blast furnace slag, or pozzolans.

Particularly preferred additives comprise: an oxyalkylene SRA, a water soluble salt (e.g., calcium nitrite), and the above-mentioned triblock polyoxyalkylene copolymer surfactant. The present invention also pertains to cementitious compositions containing the at least one admixture and the triblock polyoxyalkene copolymer surfactant, as well as methods for modifying such cementitious composition with these additives, which may be blended or interground with cement, or incorporated into a wet cementitious slurry as an admixture.

Further advantages and features of the invention will be described further hereinafter.

DETAILED DESCRIPTION OF THE INVENTION

The term "cement composition" as may be used herein refers to pastes, mortars, grouts such as oil well cementing grouts, and concrete compositions comprising a hydraulic cement binder. The terms "paste", "mortar" and "concrete" are terms of art: pastes are mixtures composed of a hydraulic cement binder (usually, but not exclusively, Portland cement, Masonry cement, Mortar cement, and/or gypsum, and may also include limestone, hydrated lime, fly ash, blast furnace slag, and silica fume or other materials commonly included in such cements) and water; mortars are pastes additionally including fine aggregate, and concretes are mortars additionally including coarse aggregate. The cement compositions tested in this invention are formed by mixing required amounts of certain materials, e.g., a hydraulic cement, water, and fine or coarse aggregate, as may be applicable to make the particular cement composition being formed.

As summarized above, the present invention provides an additive composition containing at least one admixture, such as a shrinkage reducing admixture, an air entraining admixture, a water reducing admixture, an inorganic salt, a corrosion inhibitor, an accelerator, a retarder, or mixture thereof; and the above-described triblock polyoxyalkylene copolymer surfactant.

Triblock polyoxyalkylene copolymer surfactants suitable for use in the present invention are commercially available from BASF under the PLURONIC trademark. While block copolymers of ethylene oxide (EO) and propylene oxide (PO) were introduced commercially by BASF nearly half a century ago, there are numerous (at least 90) different products to cover a broad range of physical properties and surfactant functions, and the present inventors believe that their selection of a particular triblock design, in accordance with their particular combinations with certain known admixtures and admixture types, is patentably inventive.

Thus, an exemplary triblock polyoxyalkylene copolymer surfactant useful for the present invention has the formula $R^1O-(A^1O)_x-(A^2O)_y-(A^1O)_x-R^2$ wherein $R^1$ and $R^2$ individually represent hydrogen, a $C_1$–$C_7$ alkyl group, a $C_1$–$C_6$ cycloalkyl group, or an aryl group; $A^1$ represents a $C_2$ alkyl group, $A^2$ represents a branched or linear $C_3$ alkyl group; "x" represents an integer of 42 to 133; and "y" represents an integer of 21 to 68. Preferably, the triblock polyoxyalkylene copolymer surfactant has a molecular weight of 4,000–20,000 (and more preferably in the range of 7,000–15,000 mw; and most preferably in the range of 8,000–12,000 mw) and a hydrophilic/lipophilic balance (HLB) of 20–35. Most preferred are triblock polyoxyalkylene copolymer surfactants having the formula HO—$(A^1O)_x$—$(A^2O)_y$— $(A^1O)_x$—H wherein the propylene group ($A^2$) is branched, and wherein the average molecular weight is 8,000–12,000 and HLB is 20–35.

The most preferred admixtures for use with the triblock polyoxyalkylene copolymer surfactants are shrinkage reducing admixtures (SRAs), and most preferably oxyalkylene SRAs. SRAs, and particularly oxyalkylene SRAs, are generally known in the industry, and are believed by the present inventors to be suitable for use in the instant invention. See e.g., U.S. Pat. No. 5,326,397 of Abdelrazig et al. (alkyl or cycloalkyl carbamate, an alkylene dicarbamate, polyoxyalkylene dicarbamate, or mixtures thereof); U.S. Pat. No. 5,413,634 of Shawl et al. (SRA comprising alkyl ether derivative of aliphatic polyhydroxy compound); U.S. Pat. No. 5,603,760 of Berke et al. (oxyalkylene SRA comprising an oxyalkylene compound selected from (i) an oxyalkylene glycol or (ii) oxyalkylene ether adduct of an alcohol, glycol, or glycerol; and an ammonium salt of tall oil fatty acid); , all of which are incorporated by reference herein.

Exemplary oxyalkylene shrinkage reduction admixtures (SRAs) which are believed to be suitable for purposes of the present invention include alkyl ether derivatives of aliphatic polyhydroxy compounds such as glycerin. Dialkyl ether derivatives, especially tertiary butyl ethers of glycerin are preferred. An especially preferred SRA is di-propylene glycol tertiary-butyl ether ("DTBE"), combined with di-propylene glycol, which is available from W. R. Grace & Co.-Conn., Cambridge, Mass., under the tradename ECLIPSE™.

U.S. Pat. Nos. 3,663,251 and 4,547,223, incorporated herein by reference, suggest the use of compounds of the general formula $RO(AO)_nH$ in which R may be a $C_1$–$C_7$ alkyl or $C_1$–$C_6$ cycloalkyl radical, A may be a $C_2$–$C_3$ alkylene radical, and n is 1–10, as shrinkage reducing additives for cement. These are also believed suitable for use as an exemplary admixture in the present invention.

A further oxyalkylene SRA suitable for use in the invention is disclosed in U.S. Pat. No. 5,556,460 of Berke et al., which is incorporated herein by reference. Berke et al. disclosed an SRA admixture comprising a low molecular weight oxyalkylene compound and a comb polymer having carboxylic acid groups and oxyalkylene units therein. More particularly, such an exemplary SRA comprises: (A) at least one oxyalkylene glycol, oxyalkylene ether glycol or mixtures thereof having a molecular weight up to about 4000; and (B) a comb polymer of a molecular weight of from 2,000 to 100,000 having (i) carboxylic acid anhydride, free carboxylic acid or its ammonium, alkali or alkaline earth metal salt and (ii) $C_2$–$C_5$ oxyalkylene units or mixtures of said units, wherein said units (i) or (ii) being pendant from the polymer backbone chain and said units (ii) provide the majority of the molecule. The oxyalkylene compound may be selected from (i) oxyalkylene glycols represented by the formula HOAOH or $HO(AO)_nH$ wherein A represents a $C_2$–$C_{10}$ alkylene group, O represents an oxygen atom, and n represents an integer of from 1 to about 80; (ii) oxyalkylene adducts of monoalcohols represented by the formula $RO(AO)_mH$ wherein R represents a $C_1$–$C_7$ alkyl or a $C_5$–$C_6$ cycloalkyl group, A represents a $C_2$–$C_4$ alkylene group, O represents an oxygen atom and m represents an integer of from 1 to about 10; and (iii) oxyalkylene adducts of polyols represented by the formula $Q[(OA)_pOR']_x$ wherein Q represents a $C_3$–$C_{12}$ aliphatic hydrocarbon residual group of a polyhydroxyalkane, each $R^1$ independently represents a $C_1$–$C_{14}$ alkyl or cycloalkyl group or hydrogen atom provided at least one R' of said adduct represents a $C_1$–$C_{14}$ alkyl or cycloalkyl group; A represents a $C_2$–$C_4$ alkylene group; O represents an oxygen atom; p represents an integer of from 0 to about 10; and x represents an integer of from 3 to 5; and (iv) mixtures of said oxyalkylene compounds.

Still further exemplary oxyalkylene SRAs suitable for use in the invention may comprise oxyalkylene ether adducts with higher alkylene diols, as described in U.S. Pat. No. 5,618,344 of Kerkar et al., incorporated herein by reference. Other exemplary SRAs, having optional components for air entrainment or air detrainment purposes, are also disclosed in U.S. Pat. No. 5,604,273 of Kerkar et al. (alkylene glycols and copolymers of alkenyl ether and maleic anhydride); U.S. Pat. No. 5,622,558 of Berke et al. (mixture of alkylene glycol and fume silica); U.S. Pat. No. 5,626,663 of Berke et al. (SRA comprising certain alkane diols, e.g., 2-methyl-2,4 pentanediol); U.S. Pat. No. 5,679,150 of Kerkar et al. (oxyalkylene SRA used with betaine to permit air entrainment); U.S. Pat. No. 5,779,788 of Berke et al. (mixture of lower alkyl ether of oxyalkylene adduct with sulfonated organocyclic material)

It is further known in the art to combine oxyalkylene SRAs with alkylene glycols, as discussed for example in U.S. Pat. No. 5,938,835 of Shawl et al., which is incorporated herein by reference. Patent '835 disclosed a mixture of (a) at least one alkyl ether oxyalkylene adduct represented by the formula $RO(AO)_nH$ wherein A is an alkylene (e.g., $C_2$–$C_4$) group, O is an oxygen atom, R is an alkyl group (e.g., $C_3$–$C_5$), and n is an integer from 1 to 3; and (b) an oxyalkylene glycol represented by the formula $HO(AO)_mH$ wherein A is an alkylene radical (e.g., $C_2$–$C_4$), O is an oxygen atom, and m is an integer of 1 to 3. Exemplary SRAs of component (a) include dipropylene glycol t-butyl ether, tripropylene glycol t-butyl ether, and mixtures thereof. Exemplary oxyalkylene glycols of component (b) include dipropylene glycol, tripropylene glycol, and mixtures thereof.

Accordingly, the afore-mentioned SRAs are believed to be suitable as an exemplary admixture in the present invention, useful in combination with the triblock polyoxyalkylene copolymer surfactant. It is also believed that the SRAs may be operative to reduce plastic shrinkage even if the SRAs have a diether content of 0.4–5% based on weight of the SRA.

Air entraining admixtures may also be used as an admixture in the present invention, with or without the above-described oxyalkylene SRAs, in exemplary additive compositions of the present invention. Conventional AEAs include, for example, dipropylene glycol or other short chain glycols, tall oil, vinsol resin, and others. For example, an AEA based on a vinsol resin by-product, which is believed to be suitable for use in the present invention is available from Grace Construction Products, Cambridge, MA, under the trade name DARAVAIR.

Water reducing admixtures, including "superplasticizers" which are high range water reducing admixtures, may also be used as an exemplary admixture in the present invention, with or without the oxyalkylene SRAs, in additive compositions of the present invention. Examples of suitable water-reducing admixtures are lignosulfonic acids and salts or derivatives thereof (e.g., lignin sulfonates), naphthalene sulfonate formaldehyde condensates, melamine sulfonate formaldehydes, polyacrylates, amines and their derivatives, and alkanolamines. The amount of such water reducing admixtures to be used can range from 0.05 to 5 weight percent based on the cement content of the formed composition. Polycarboxylate copolymers which are suitable superplasticizers may be "comb polymers" comprising a carbon-containing backbone having pendent cement-anchoring members and pendent oxyalkylene groups attached to the backbone. See e.g., U.S. Pat. No. 5,393,343 of Darwin et al.; U.S. Pat. No. 5,728,207 of Darwin et al.; and U.S. Pat. No. 5,725,657 of Darwin et al.; all of which are incorporated by reference herein. Suitable water reducing admixtures/superplasticizers are available from Grace under the trade name ADVA® (e.g., ADVA FLOW).

Inorganic salts such as borates, phosphates, chlorides, nitrites, and nitrates may also be used as exemplary admixtures in the present invention, with or without the oxyalkylene SRAs. Exemplary water soluble salts which may be used in the invention include cations such as $Ca^{++}$, $Na^+$, $H^+$, $K^+$, $Mg^{++}$, $Cs^+$, $Rb^+$, $Fr^+$, or a mixture thereof, in combinations with anions such as nitrates (—$NO_3$), nitrites ($NO_2$), chlorides (—Cl), and thiocyanates (—SCN). Preferred salts are calcium nitrite, calcium nitrate, or a mixture thereof. Other exemplary salts include $CaCl_2$, $NaNO_3$, $NaS_{24}$, and NaCl.

Reinforcing-steel corrosion inhibitors may also be used as exemplary admixtures in the present invention, with or without the oxyalkylene SRAs. These include sodium nitrate and calcium nitrite.

Conventional hardening accelerators may also be employed as exemplary admixtures in the present invention, with or without the oxyalkylene SRAs. These include metal chlorides such as calcium chloride and sodium chloride; metal sulfates such as sodium sulfate; and organic amines such as triethanolamine.

Conventional retarders may also be employed as exemplary admixtures in the present invention, with or without the oxyalkylene SRAs. Examples include alcohols, sugars, starch, and cellulose. Other examples include glycerol, corn syrup or saccharides, and hydroxy carboxylic acids.

The amount of the foregoing known admixtures are conventionally added to cement in the range of 0.01–5% or more based on the weight of cement and depending upon the nature of the mix and quality of the cement. Thus, one or more admixtures, e.g., oxyalkylene SRA and water soluble salt, may be used each in the range of 0.01–10% s/s (percentage weight solids based on weight of cement), and more preferably 0.05–5% s/s; and the exemplary triblock polyoxyalkylene copolymer surfactant may be used in the range of about 0.005–5.0% s/s, and more preferably 0.01–0.5% S/s In particularly preferred embodiments, the use of the triblock polyoxyalkylene copolymer surfactant permits air entrainment in concrete containing oxyalkylene SRAs, with or without a reduction in the diether content, and further works in conjunction with water soluble salts (especially calcium salts, and particularly calcium nitrite). In addition, air entrainment is enhanced for concretes containing other admixtures, with or without SRA's or water soluble salts. Finally, the invention works well over a wide range of concrete temperatures. It has been unexpectedly found that small doses of relatively higher molecular weight (e.g., at least 7,000) triblock polyoxyalkylene copolymer surfactants having the EO/PO/EO structure provide stable, controllable, and desirable degrees of entrained air in concrete containing the above durability enhancing admixtures.

In addition to an additive composition which comprises at least one of the admixtures and the triblock polyoxyalkylene copolymer surfactant as previously described above, the present invention also provides cementitious compositions containing said additive compositions and a cementitious binder, such as Portland cement, gypsum, which may be optionally modified with limestone, hydrated lime, fly ash, blast furnace slag, and silica fume (or other pozzolans or pozzolanic materials commonly included in such cements) and optionally a fine aggregate, coarse aggregate, or mixture thereof. Exemplary methods of the invention comprise introducing the above-described additive composition components, either individually or blended together, to a cementitious binder; and this may be done during intergrinding process whereby clinker is ground into cement, by addition to dry cement, or by admixing the additive components into a slurry containing the cement binder, pozzolans, and/or aggregates.

The invention may be more readily comprehended when the following examples are considered.

EXAMPLE 1

Concrete was produced in laboratory conditions at 70° F. to determine to what extent a commercially available triblock polyoxyalkylene copolymer surfactant (e.g., F68 from BASF) improved air entrainment. The average molecular weight of the F68 copolymer surfactant is 8400 and HLB was 29. Details of the concrete are in provided below in Table 1. The SRA in Table 1 was DPTB and DPG employed at 50% (s/s based on cement) with a diether content of about 1%. A comb polymer superplasticizer was added at 5% solids based on the combined mass of DPTB and DPG. The air entrainer DAREX® II is a commercial tall oil derivative air entraining admixtures (Grace Construction Products). DCI®S Corrosion Inhibitor is a calcium nitrite based product (Grace). An improvement in total air and reduction in spacing factor was observed.

TABLE 1

| Cement Type 1 658 pcy | SRA gpy | Darex® oz/cwt | F68 % s/s on SRA | DCI-S gpy | Slump Inches | Air % | Spacing Factor inches | Average Cord length inches | Specific Surface l/inches |
| --- | --- | --- | --- | --- | --- | --- | --- | --- | --- |
| 170-01 | 1.00 | 2.00 |  | 2.00 | 3.00 | 4.50 | 0.0084 | 0.0066 | 602 |
| 170-01 | 1.00 | 1.50 | 0.14 | 2.00 | 4.25 | 7.00 | 0.0062 | 0.0058 | 695 |

EXAMPLE 2

In this example the ability to increase air with the same SRA as in example 1 is demonstrated.

TABLE 2

| Cement Type | SRA Gpy | Darex II oz/cwt | F68 % s/s on SRA | Slump Inches | Air % |
| --- | --- | --- | --- | --- | --- |
| 658 pcy | | | | | |
| 051-12 | 1.00 | | | 5.00 | 2.00 |
| 051-12 | 1.00 | 0.25 | 0.27 | 5.50 | 6.00 |

EXAMPLE 3

This example demonstrates that in high alkaline cement at low temperatures the admixture in the invention will not overly air entrain and at higher temperatures with a low alkali cement air entrainment is possible. Generally, it is easier to obtain air entrainment at low temperatures and high alkalinity, and it is more difficult to entrain air at high temperatures with low alkalinity. The SRA is the same as in the previous examples.

TABLE 3

| Temp. Degrees F. | Cement Type 658 pcy | SRA gpy | Darex II oz/cwt | F68 % on SRA | Adva Flow oz/cwt | Slump Inches | Air % |
| --- | --- | --- | --- | --- | --- | --- | --- |
| 50 | 006-01 | 1.00 | | 0.41 | | 2.00 | 2.60 |
| 50 | 006-01 | 1.00 | 1.75 | 0.41 | 0.75 | 3.25 | 7.50 |
| 90 | 143-01 | 1.00 | 2.00 | 0.41 | 3.00 | 3.00 | 6.40 |

006 cement is high alkali and 143 is low alkali.

EXAMPLE 4

In this example, the advantages of using the invention as an air entrainer is demonstrated. The standard Darex® II Air Entraining Admixture was unable to entrain air in a mixture having ADVA® 100 Superplasticizer (both products of Grace). The addition of a triblock polyoxyalkylene copolymer surfactant (F68 from BASF) dissolved in water at a 5 percent by mass solution resulting in air entrainment with a significant reduction in the Darex II addition rate. The results are provided in Table 4 below.

TABLE 4

| Cement Type | Darex II oz/cwt | F68 oz/cwt | Adva 120 oz/cwt | Slump Inches | Air % |
| --- | --- | --- | --- | --- | --- |
| 170-01 | 16.00 | | 3.00 | 2.50 | 3.80 |
| 170-02 | 4.00 | 4.50 | 3.00 | 4.75 | 12.60 |

The foregoing discussion of exemplary embodiments and examples is provided for illustration only and not intended to limit the scope of the invention which is further described in the appended claims.

It is claimed:

1. An additive composition for modifying a cementitious composition, comprising: (A) at least one admixture a shrinkage reducing admixture, an air entraining admixture, a water reducing admixture, an inorganic salt, a corrosion inhibitor, an accelerator, a retarder, or mixture thereof; and (B) a triblock polyoxyalkylene copolymer surfactant having the formula

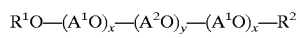

$$R^1O-(A^1O)_x-(A^2O)_y-(A^1O)_x-R^2$$

wherein $R^1$ and $R^2$ represent hydrogen, a $C_1$–$C_7$ alkyl group, a $C_5$–$C_6$ cycloalkyl group, or an aryl group; $A^1$ represents a $C_2$ alkyl group, $A^2$ represents a $C_3$ alkyl group; "x" represents an integer of no less than 42 and no greater than 133; and "y" represents an integer no less than 21 and no greater than 68.

2. The additive composition of claim 1 wherein said triblock polyoxyalkylene copolymer surfactant has a molecular weight not less than 4,000; and said triblock polymer has a molecular weight not greater than 20,000.

3. The additive composition of claim 1 wherein said triblock polyoxyalkylene copolymer surfactant has a molecular weight not less than 8,000; and said triblock polymer surfactant has a molecular weight not greater than 15,000.

4. The additive composition of claim 1 wherein said triblock polyoxyalkylene copolymer surfactant has a hydrophilic/lipophilic balance (HLB) not less than 20; and said triblock polymer surfactant has an HLB not greater than 35.

5. The additive composition of claim 2 wherein said at least one admixture is a shrinkage reducing admixture.

6. The additive composition of claim 5 wherein said shrinkage reducing admixture comprises oxyalkylene groups.

7. The additive composition of claim 5 wherein said oxyalkylene group-containing shrinkage reducing admixture has a diether content is no less than 0.4% based on total weight solids in the additive composition and has a diether content no greater than 5% based on total weight solids in the additive composition.

8. The additive composition of claim 5 wherein said shrinkage reducing admixture is dipropylene glycol t-butyl ether.

9. The additive composition of claim 5 wherein said shrinkage reducing admixture comprises dipropylene glycol t-butyl ether (DPTB) and dipropylene glycol (DPG) wherein the ratio of DTPB:DPG is 33:67 to 99:1.

10. The additive composition of claim 5 wherein said shrinkage reducing admixture comprises (i) an oxyalkylene glycol or (ii) oxyalkylene ether adduct of an alcohol, glycol, or glycerol; and said composition further comprises an ammonium salt of tall oil fatty acid.

11. The additive composition of claim 5 further comprising a water soluble salt.

12. The additive composition of claim 11 wherein said water soluble salt is a calcium salt.

13. The additive composition of claim 1 wherein said at least one admixture is an air entraining admixture.

14. The additive composition of claim 1 wherein said at least one admixture is a water reducing admixture.

15. The additive composition of claim 14 wherein said water reducing admixture is a superplasticizing comb polymer having pendant oxyalkylene groups.

16. The additive composition of claim 14 wherein said at least one admixture is a polycarboxylate superplasticizer.

17. The additive composition of claim 2 wherein said at least one admixture is an inorganic salt.

18. The additive composition of claim 2 wherein said at least one admixture is a corrosion inhibitor.

19. The additive composition of claim 18 wherein said corrosion inhibiting admixtures is calcium nitrite, calcium nitrate, or mixture thereof.

20. The additive composition of claim 2 wherein said at least one admixture is an accelerator, retarder, or mixture thereof.

21. A cementitious composition comprising: a cementitious binder and the additive composition of claim 1.

22. The cementitious composition of claim 21 wherein said cementitious binder comprises Portland cement.

23. The cementitious composition of claim 21 wherein said cementitious binder comprises gypsum.

24. A method for modifying a cementitious composition, comprising: introducing to a cementitious binder the additive composition of claim 1.

25. The method of claim 24 wherein said additive composition is introduced to said cementitious binder during an intergrinding process for manufacturing said binder.

26. A method of claim 24 wherein said additive composition is introduced to said cementitious binder while said binder is in the form of a wet paste or slurry.

27. The additive composition of claim 1 wherein said triblock polyoxyalkylene copolymer surfactant has the formula formula HO—$(A^1O)_x$—$(A^2O)_y$—$(A^1O)_x$—H and an average molecular weight of 8,000–12,000.

28. A method comprising combining a cementitious binder with (A) at least one admixture a shrinkage reducing admixture, an air entraining admixture, a water reducing admixture, an inorganic salt, a corrosion inhibitor, an accelerator, a retarder, or mixture thereof; and (B) a triblock polyoxyalkene copolymer surfactant having the formula $$R^1O\text{—}(A^1O)_x\text{—}(A^2O)_y\text{—}(A^1O)_x\text{—}R^2$$

wherein $R^1$ and $R^2$ represent hydrogen, a $C_1$–$C_7$ alkyl group, a $C_5$–$C_6$ cycloalkyl group, or an aryl group; $A^1$ represents a $C_2$ alkyl group, $A^2$ represents a $C_3$ alkyl group; "x" represents an integer of no less than 42 and no greater than 133; and "y" represents an integer no less than 21 and no greater than 68.

* * * * *